2,935,545
Patented May 3, 1960

2,935,545

HYDROISOMERIZATION PROCESS

Herman S. Bloch, Skokie, and Vladimir Haensel, Hinsdale, Ill., assignors, by mesne assignments, to Universal Oil Products Company, Des Plaines, Ill., a corporation of Delaware No Drawing. Application April 30, 1958
Serial No. 731,872

14 Claims. (Cl. 260—683.66)

This application is a continuation-in-part of our copending application Serial No. 622,267, filed November 15, 1956, now abandoned.

This invention relates to a process for the hydroisomerization of isomerizable organic compounds, and more particularly relates to the hydroisomerization of saturated hydrocarbons in the presence of a novel catalytic composition. Still more particularly, this invention relates to a hydroisomerization process for the conversion of less highly branched chain paraffin hydrocarbons into more highly branched chain paraffin hydrocarbons utilizing as a catalyst one prepared by reacting boron trifluoride with a refractory oxide containing chemically combined hydroxyl groups, which refractory oxide has been composited previously with an inorganic hydrogenation component and calcined, said reaction of boron trifluoride with the oxide resulting in the formation of at least 0.5 mol but not more than 2.0 mols of hydrogen fluoride per mol of boron trifluoride adsorbed thereon.

In recent years with the advances in the automotive industry, fuels of relatively high octane ratings have been found to be necessary. Many petroleum refining processes have been provided for the production of such high antiknock fuels. These processes include alkylation, catalytic reforming, catalytic cracking, and high temperature thermal cracking and thermal reforming operations. Other processes, which may in one sense be considered auxiliary, were developed, for example, isomerization, which was employed to produce isoparaffins which were subsequently reacted with olefins to form a high octane number motor fuel fraction, commonly termed alkylate. In addition to the production of one of the reactants for alkylation, isomerization was also utilized to increase the antiknock quality of saturated hydrocarbons such as paraffins and naphthenes found in selected fractions of gasolines and naphthas. An example of the latter type of operation is a process in which pentane and/or hexane fractions are isomerized to produce isopentane and isomeric hexanes which subsequently may be employed as blending agents in automotive and aviation fuels.

In most of the above mentioned isomerization processes, catalytic agents have been employed to effect the desired molecular rearrangement. These prior art catalytic agents have been employed in what may be termed low temperature processes. Ordinarily the catalytic agents utilized in such processes consist of metal halides, such as aluminum chloride, aluminum bromides, etc., which are activated by the addition of the corresponding hydrogen halide. These catalytic agents are initially active and effect high conversion per pass at relatively low temperature. However, the activity of these catalysts is so high that the catalysts accelerate decomposition reactions as well as isomerization reactions with the result that the ultimate yield of isomerized product is reduced considerably. These decomposition or cracking reactions also increase considerably catalyst consumption by reaction of fragmental material with the catalytic agent to form sludge-like material. In spite of what might have been predicted, these decomposition and/or cracking reactions cannot be reduced by simply lowering the reaction zone temperature. At temperatures at which satisfactory reactions are obtained with these prior art catalytic agents, these cracking reactions are pronounced. One means which has been utilized in an attempt to decrease or overcome these cracking reactions is the concurrent utilization of hydrogen along with the isomerizable organic compound being processed. While some improvement in conventional processes has been observed, these prior art processes have not been improved to the extent that they have been widely accepted by the petroleum refining industry.

Isomerization processes which are carried out or operated with continuous hydrogen addition or in the presence of hydrogen can be termed hydroisomerization processes. We have discovered a novel catalytic agent which may be more effectively employed for the hydroisomerization of saturated hydrocarbons as well as the hydroisomerization of other types of isomerizable organic compounds. Our catalytic agent consists of a partial reaction product of boron trifluoride with a refractory oxide containing chemically combined hydroxyl groups, which refractory oxide prior to partial reaction with boron trifluoride has previously had composited therewith a hydrogenation component followed by calcination. This partial reaction of boron trifluoride with these hydroxyl groups in the refractory oxide results in the formation of at least 0.5 mol but not more than 2.0 mols of hydrogen fluoride per mol of boron trifluoride adsorbed thereon. As will be set forth in detail hereinafter, the components of this multicomponent catalyst exert a beneficial effect upon one another so that the catalyst is exceptionally effective for the types of reactions herein disclosed. For example, a preferred catalyst within the generally broad scope of the present invention results from the reaction of boron trifluoride with residual hydroxyl groups in gamma-alumina containing small quantities of platinum. As one skilled in the art might expect, the alumina, in one sense, may be considered to be a support for the other catalyst components. However, the results obtained with the multicomponent catalyst cannot be obtained by the utilization of a physical mixture of (1) alumina reacted with boron trifluoride, and (2) alumina impregnated with platinum. While the catalysts described herein for use in the process of the present invention include reaction products of boron trifluoride, these catalysts possess catalytic properties superior to those of boron trifluoride itself. These superior properties apparently result from a particular association of the reaction product of boron trifluoride and other components of the composition.

One embodiment of the present invention relates to a process for the hydroisomerization of an isomerizable organic compound which comprises contacting said isomerizable organic compound and hydrogen at hydroisomerization conditions with a catalyst prepared by reacting boron trifluoride with a refractory oxide containing chemically combined hydroxyl groups, which oxide has been composited previously with an inorganic hydrogenation component and calcined, said reaction resulting in the formation of at least 0.5 mol but not more than 2.0 mols of hydrogen fluoride per mol of boron trifluoride adsorbed thereon.

Another embodiment of the present invention relates to a process for the hydroisomerization of a saturated hydrocarbon which comprises contacting said saturated hydrocarbon and hydrogen at hydroisomerization conditions with a catalyst prepared by reacting boron trifluoride with a refractory oxide containing chemically combined hydroxyl groups, which oxide has been composited previously with an inorganic hydrogenation component and calcined, said reaction resulting in the formation of at least 0.5 mol but not more than 2.0 mols of hydrogen fluoride per mol of boron trifluoride adsorbed thereon.

Another embodiment of the present invention relates to a process for the hydroisomerization of a less highly branched chain paraffin hydrocarbon to a more highly branched chain paraffin hydrocarbon which comprises contacting said less highly branched chain paraffin hydrocarbon and hydrogen at hydroisomerization conditions with a catalyst prepared by reacting boron trifluoride with alumina containing chemically combined hydroxyl groups, which alumina has been composited previously with platinum and calcined, said reaction resulting in the formation of at least 0.5 mol but not more than 2.0 mols of hydrogen fluoride per mol of boron trifluoride adsorbed thereon.

One specific embodiment of the present invention relates to a process for the hydroisomerization of n-butane which comprises contacting said n-butane and hydrogen at hydroisomerization conditions in the presence of a catalyst prepared by reacting boron trifluoride with gamma-alumina containing chemically combined hydroxyl groups, which gamma-alumina has been composited previously with platinum and calcined, said reaction resulting in the formation of at least 0.5 mol but not more than 2.0 mols of hydrogen fluoride per mol of boron trifluoride adsorbed thereon.

Another specific embodiment of the present invention relates to a process for the hydroisomerization of n-pentane which comprises contacting said n-pentane and hydrogen at hydroisomerization conditions with a catalyst prepared by reacting boron trifluoride with gamma-alumina containing chemically combined hydroxyl groups, which gamma-alumina has been composited previously with platinum and calcined, said reaction resulting in the formation of at least 0.5 mol but not more than 2.0 mols of hydrogen fluoride per mol of boron trifluoride adsorbed thereon.

A further specific embodiment of the present invention relates to a process for the hydroisomerization of n-hexane which comprises contacting said n-hexane and hydrogen at hydroisomerization conditions with a catalyst prepared by reacting boron trifluoride with gamma-alumina containing chemically combined hydroxyl groups, which gamma-alumina has been composited previously with platinum and calcined, said reaction resulting in the formation of at least 0.5 mol but not more than 2.0 mols of hydrogen fluoride per mol of boron trifluoride adsorbed thereon.

The process of our invention is particularly applicable to the hydroisomerization of saturated hydrocarbons including acyclic paraffins and cyclic naphthenes, and is particularly suitable for the hydroisomerization of straight chain or less highly branched chain paraffins containing 4 or more carbon atoms per molecule including normal butane, normal pentane, normal hexane, 2-methylpentane, 3-methylpentane, normal heptane, 2-methylhexane, 3-methylhexane, normal octane, 2-methylheptane, 3-methylheptane, 4-methylheptane, etc. Cycloparaffins or naphthenes which are converted in our hydroisomerization process should contain at least 5 carbon atoms in the ring such as alkylcyclopentanes and cyclohexanes and include methylcyclopentane, cyclohexane, 1,1-dimethylcyclopentane, 1,2-dimethylcyclopentane, 1,3-dimethylcyclopentane, methylcyclohexane, 1,1-dimethylcyclohexane, 1,2-dimethylcyclohexane, 1,3-dimethylcyclohexane, 1,4-dimethylcyclohexane, etc. The process is also applicable to the conversion of mixtures of paraffins and/or naphthenes such as those derived by selective fractionation of straight run or natural gasolines and naphthas. Such mixtures of paraffins and/or naphthenes include so-called pentane fractions, hexane fractions, heptane fractions, etc., and mixtures thereof. The process of our invention is also applicable to the hydroisomerization of olefins, for example, the double bond shifting of 1-butene to 2-butene, the double bond shifting of 3-methyl-1-butene to 2-methyl-2-butene, etc., although obviously not necessarily under the same conditions as are utilized for the hydroisomerization of saturated hydrocarbons, since the tendency of olefins to be hydrogenated in the presence of hydrogen and the catalyst must be overcome, for example, by the use of lower pressures. The process may also be used for the hydroisomerization of alkylaromatic hydrocarbons, for example, the hydroisomerization of ethylbenzene to xylenes, the hydroisomerization of propylbenzene to methylethylbenzenes, etc.

The catalyst used in our process comprises a refractory oxide, a hydrogenation component, and the reaction product of boron trifluoride with residual hydroxyl groups on the surface of said refractory oxide. Thus, the refractory oxide will be of a type similar to that used in the preparation of catalytic agents for hydrocarbon conversion reactions and will contain hydroxyl groups distributed over the surface thereof, said surface preferably comprising a rather large area, for example, from about 50 to about 1000 square meters per gram. The refractory oxide is a solid and may be selected from diverse high surface area refractory oxides which are not necessarily equivalent for use as so-called supports in preparing these catalysts. Among suitable refractory oxides are such various substances as silica, alumina, titanium dioxide, zirconium dioxide, chromia, zinc oxide, silica-alumina, silica-magnesia, silica-alumina-magnesia, chromia-alumina, alumina-boria, silica-zirconia, silica-alumina-zirconia, etc., and also various naturally occurring refractory oxides of differing degrees of purity such as bauxite, kaolin or clay (which may or may not have been acid treated), diatomaceous earths such as kieselguhr, montmorillonites, spinels such as magnesium oxide-alumina spinels or zinc oxide spinels, etc. Of the above mentioned refractory oxides, alumina is preferred, and particularly preferred is synthetically prepared gamma-alumina of a high degree of purity.

All of these above mentioned refractory oxides, whether synthetically prepared or naturally occurring, contain both chemically combined and physically absorbed water. By various well known techniques such as drying and/or calcination, the water content of these refractory oxides can be lowered and minimized while at the same time a surface can be developed which surface is useful either by itself or in combination with other materials as a site for accelerating reactions, such as catalyzed hydrocarbon conversion reactions. It is well known that excessive temperatures can destroy these surfaces and thus must be avoided. In the drying and/or calcination of a suitable refractory oxide, such as alumina, physically absorbed water is first removed therefrom. Then, at still higher temperatures, chemically combined hydroxyl groups begin to escape from the surface. This is accomplished by the combination of two hydroxyl groups, for example, to form one molecule of water and a new oxide bond. In the case of alumina, the complete elimination of chemically combined hydroxyl groups from the surface thereof results, under conditions of calcination, in conversion of the alumina to the well known anhydrous alpha-alumina which is generally unsatisfactory or inert as a catalyst support. These unsatisfactory or inert properties have previously been attributed to the low surface area of alpha-alumina but they are now considered to be additionally related to the loss of chemically combined hydroxyl groups. Thus, as set forth hereinabove, while many refractory oxides are suitable for supports for the catalysts of the process of the present invention, these refractory oxides are characterized by the presence on the surface thereof of chemically combined hydroxyl groups. The presence of such chemically combined hydroxyl groups can be determined by treatment of these refractory oxides after drying and/or calcination with anhydrous hydrogen chloride which tends to react with said hydroxyl groups with the elimination of water and the substitution of chlorine atoms for hydroxyl groups. Then, the chlorine content of such refractory oxides can be readily determined by known analytical techniques. This chlorine content can then be specified as equal to the hydoxyl equivalents on the surface of said refractory oxides.

In the catalysts used in the process of the present invention, the above described refractory oxides have composited therewith a hydrogenation component, and the composites are calcined prior to reaction of boron trifluoride therewith. Suitable hydrogenation components include metals of subgroup VI and group VIII of the periodic table including chromium, molybdenum, tungsten, iron, cobalt, nickel, platinum, palladium, ruthenium, rhodium, osmium, and iridium. These metals are not necessarily equivalent as hydrogenation components in the catalysts utilized in the process of the present invention and of these metals, platinum and palladium are preferred, and platinum metal is particularly preferred.

These hydrogenation components may be composited with the above mentioned refractory oxides in any desired manner, such as by impregnation, coprecipitation, etc. Impregnation techniques are well known and in one such method a compound of the desired hydrogenation component, such as the platinum compound chloroplatinic acid, is dissolved in a suitable solvent and the refractory oxide is contacted therewith, followed by drying and calcination. When synthetically prepared refractory oxides of high degrees of purity are utilized, it is sometimes desirable or preferable to coprecipitate the platinum group metal along with the refractory oxide. Following such coprecipitation, the resultant composite is dried and calcined. As set forth hereinabove, of the metals which may be composited with a refractory oxide prior to reaction thereof with boron trifluoride, platinum and palladium are preferred, and platinum is particularly preferred. As hereinabove described, the composite of platinum group metal and refractory oxide, prepared by impregnation, coprecipitation, etc., is next dried and calcined. This calcination is normally carried out under carefully controlled conditions to remove therefrom physically absorbed solvents such as water but under sufficiently mild conditions so that chemically combined hydroxyl groups are not completely eliminated or lost. Calcination temperatures ranging from about 350° C. to about 700° C. are usually satisfactory. As stated previously, the presence of these chemically combined hydroxyl groups in such platinum group metal-refractory oxide composites is a necessary prerequisite for preparation of the catalytic agents for use in the process of the present invention. After the platinum group metal has been composited with the refractory oxide, and after said composite has been calcined, the chemically combined hydroxyl groups on the surface thereof are reacted with boron trifluoride. This reaction takes place with the formation of about 0.5 mols to about 2.0 mols of hydrogen fluoride per mol of boron trifluoride absorbed on the composite of refractory oxide and hydrogenation component.

The preferred catalyst composition for use in this hydroisomerization process comprises an alumina-platinum composite, which composite has had the chemically combined hydroxyl groups on the surface thereof reacted with boron trifluoride.

As stated hereinabove, the alumina is preferably synthetically prepared substantially anhydrous gamma-alumina of a high degree of purity. The methods of preparation of such synthetic gamma-aluminas are well known. For example, they may be prepared by calcination of alumina gels which are commonly formed by adding a suitable reagent, such as ammonium hydroxide, ammonium carbonate, etc., to a salt of aluminum such as aluminum chloride, aluminum sulfate, aluminum nitrate, etc., in an amount to form aluminum hydroxide which upon drying and calcination is converted to gamma-alumina. It has been found that aluminum chloride is generally preferred as the aluminum salt, not only for convenience in subsequent washing and filtering procedures but also because it appears to result in the most active catalytic composite. Alumina gels may also be prepared by the reaction of sodium aluminate with a suitable acidic reagent to cause precipitation thereof with the resultant formation of aluminum hydroxide gel. Synthetic aluminas may also be prepared by the formation of alumina sols by the reaction of metallic aluminum with hydrochloric acid, which sols can be gelled with suitable precipitation agents such as ammonium hydroxide, followed by drying and calcination. In one embodiment these synthetically prepared aluminas may contain from about 0.01% to about 8% combined halogen based on the weight of the dry alumina, the combined halogen preferably being fluorine. However, the amount of combined halogen, particularly fluorine, is preferably kept within the lower region of the above described range since the combined halogen substitutes to some degree for the combined hydroxyl groups which will later appear on the catalyst surface for reaction with the boron trifluoride. Therefore, if the amount of combined halogen is substantial, the amount of chemically combined free hydroxyl groups will be relatively low and maximum catalyst activity development will be precluded since extensive reaction between the boron trifluoride and free hydroxyl groups is thereby prevented. These halogenated aluminas may be prepared in various manners, for example, by the addition of a suitable quantity of hydrofluoric acid to an alumina gel prior to drying and calcination thereof. In another manner, ammonium fluoride can be added to alumina gels thus yielding an alumina having the desired quantity of fluorine combined therewith. When the synthetically prepared alumina is prepared from aluminum chloride, it is sometimes advantageous and/or desirable to minimize the washings thereof to retain a desired amount of chlorine combined with the alumina. In any of the above instances when the alumina is prepared from an alumina sol or an alumina gel, the resultant product is calcined to a sufficient temperature to convert the product into gamma-alumina of high surface area. Such calcinations are normally carried out at a temperature of from about 350° C. to about 700° C. and preferably at temperatures of from about 500° C. to about 650° C. The resultant gamma-alumina prepared in this manner will contain small quantities of physically adsorbed water of hydration but the calcination temperatures are beneath those wherein substantially all chemically combined hydroxyl groups are converted to water and oxide linkages. Since such resultant aluminas are desiccants, if they are to be stored, the storage should be carried out in a dry atmosphere to preclude re-absorption of water thereon.

However, in many instances the thus prepared and calcined alumina is composited with an aqueous solution of a compound of a hydrogenation component, particularly a compound of a platinum group metal. In such cases, it is not only necessary to recalcine the above described alumina to develop maximum surface thereon but further calcination becomes necessary to remove physically adsorbed water which has been introduced during the platinum impregnation step. The platinum group metal, particularly platinum, can be composited with the alumina in any of many well known manners. For example, an ammoniacal solution of chloroplatinic acid may be admixed with alumina, followed by drying, calcination, and reduction. In another method, chloroplatinic acid in the desired quantity can be added to an alumina gel slurry followed by precipitation of the platinum thereon on the alumina by means of hydrogen sulfide or other sulfiding agents. In another method, the platinum may be coprecipitated with the alumina gel, for example, by the introduction of a suitable platinum compound into an alumina sol followed by or simultaneously with the addition of the precipitation agent. While the quantity of platinum composited with the alumina is not critical, for economic reasons it is usually kept at a minimum. Thus, although large amounts of platinum do not cause detrimental effects, it is generally preferred to utilize from about 0.01% to about 2% by weight of platinum based on the dry alumina.

While the form of the platinum group metal-refractory oxide composite is not critical, it is generally preferred to utilize macro size particles so that the total composite may be utilized as a fixed bed in a reaction zone. Thus, it is desirable to form the synthetically prepared alumina either before or after the platinum group metal is composited therewith into pellets, for example, of $\frac{1}{16}$ inch by $\frac{1}{16}$ inch size, or $\frac{1}{8}$ inch by $\frac{1}{8}$ inch size, etc. Alternatively, the particles may be in the form of spheres or irregularly shaped pieces such as result from extrusion. The pellets may be formed, in one method, by grinding the dried alumina gel to a powder followed by pilling thereof by known methods. While it is not meant to limit the invention to particles of any particular size, the above mentioned alumina-platinum composites are definitely preferred. These composites of platinum group metals and refractory oxides, for example, platinum and alumina, are somewhat hygroscopic and it is usually necessary to store them in or under an atmosphere of reduced humidity. However, when the boron trifluoride is composited therewith immediately after preparation, drying, and calcination, no such precaution is necessary.

The synthetically prepared alumina-platinum composites are next impregnated with boron trifluoride to form the desired catalyst for use in the process of the present invention. Boron trifluoride is a colorless gas boiling at $-101°$ C. Thus, the impregnation is usually carried out by disposing the particles of alumina-platinum composite as a fixed bed in an impregnating zone and by passing thereover a desired quantity of boron trifluoride under conditions of reaction of the boron trifluoride with the chemically combined hydroxyl groups on the surface of said composite. This reaction is accompanied by the formation of about 0.5 to about 2.0 mols of hydrogen fluoride per mol of boron trifluoride adsorbed thereon. If greater or lesser amounts of hydrogen fluoride are formed, insufficient active centers are present. The hydrogen fluoride formed by the reaction of boron trifluoride with hydroxy groups may react with other hydroxy groups of the refractory oxide base, liberating water and fixing the fluoride on the base; or it may be in whole or in part liberated (especially at the higher temperatures of impregnation and when larger amounts of boron trifluoride are used) as gaseous hydrogen fluoride; or it may complex with $>$Al—OBF$_2$.

The boron trifluoride impregnation can be carried out under pressure, if desired, and also in the presence of diluents such as inert gases including nitrogen, hydrogen, and paraffin hydrocarbons. Boron trifluoride has limited solubility in paraffinic hydrocarbons, which solubility is increased by pressure, and thus liquid solutions of boron trifluoride and paraffinic hydrocarbons may be prepared, particularly under pressure, and utilized for liquid phase impregnation of the above described alumina-platinum composites. A suitable impregnation temperature will range from about 100° C. to about 600° C., although temperatures within the range of from about 200° C. to about 400° C. are preferred. The amount of boron trifluoride normally utilized for this impregnation may range from about 1% to about 50% by weight based on the weight of the refractory oxide-platinum group metal composite prior to impregnation. Not all of the boron trifluoride will necessarily react. However, the amount which does react is determined and limited by the equivalents of hydroxyl groups on the surface of the refractory oxide. The reaction of boron trifluoride with the hydroxyl groups on the surface of the alumina-platinum group metal composites yields $>$Al—OBF$_2$ active centers, which may be in turn coordinated with further quantities of boron fluoride, e.g., as the structure $$>Al—OBF_2 \cdot BF_3$$

Because of this particular structure these active centers are very active catalyst components for the reaction of hydroisomerization as herein disclosed. Furthermore, it is thought that the high activity and unusual catalytic properties of these catalysts for use in the process of this invention are due to the particular association of such active centers with the platinum group metal and base composite. One unusual feature of these catalysts is that they may be utilized as catalysts for reactions in which it has heretofore been considered necessary to utilize hydrogen halide promoters along with the catalysts. For example, it has previously been considered necessary to promote boron trifluoride with hydrogen fluoride for use as a catalyst for molecular rearrangement of normal paraffins to isoparaffins. Hydrogen fluoride is not particularly suitable as a promoter for most of the presently disclosed catalysts since it reacts with the catalyst support and tends to destroy its surface area. However, the use of hydrogen chloride as a promoter with the catalyst composition for use in the process of the present invention is not meant to be excluded although it has been found unnecessary to use it to obtain satisfactory results with these catalysts. In addition to hydrogen chloride promoters, other materials well known to promote isomerization reactions of saturated hydrocarbons include controlled amounts of olefins, secondary or tertiary alkyl chlorides, oxygen, bromine, water, etc. As stated hereinabove with reference to the utilization of hydrogen chloride as a promoter, it has been found that the present catalysts give satisfactory results in the absence of such materials. However, such promoters may be utilized when desirable, and no intention is meant to exclude the use thereof along with the present catalyst. Compounds such as cyclic hydrocarbons have been shown in the prior art to be cracking suppressors for the isomerization of saturated hydrocarbons reactions. Side reactions such as cracking encountered in the present invention with the heretofore described catalysts are minimized, and thus the use of such cracking suppressors has not been found to be necessary. However, they may be utilized in substantially the same manner as has been described in the prior art.

The process of this invention is directed to the hydroisomerization of organic compounds in which molecular rearrangements are accomplished at hydroisomerization conditions. While the use of hydrogen in prior art isomerization processes has been disclosed as a cracking suppressor it is felt that the hydrogen pressure or partial pressure is a much more important variable in the process of this invention. This use of hydrogen is based upon the feeling that hydrogen apparently plays an important role in the mechanism of the hydroisomerization reaction and its utilization in the hydroisomerization reaction is more than simply as a cracking suppressor. In this hydroisomerization process sufficient hydrogen should be utilized so that the hydrogen to hydrocarbon molar ratio of the reaction zone feed will be within the range of from about 0.25 to about 10. When smaller quantities of hydrogen are utilized, the catalyst rapidly deactivates and cracking reactions become prominent. The use of too much hydrogen is detrimental since the hydroisomerization reaction can be stopped completely by this means. This last mentioned effect illustrates the fact that the hydrogen plays a more important role in these hydroisomerization reactions than that merely of a cracking suppressor. The hydrogen may be supplied from any convenient source and will generally be recycled within the process so that hydrogen consumption will be for all practical purposes negligible. The hydrogen utilized may be purified or may be diluted with various inert materials such as nitrogen, methane, ethane, propane, etc. Also, small amounts of sulfur in the feed stock may be tolerated without harmful effects on the present catalyst.

As hereinbefore stated, the catalyst utilized in the process of this invention has high hydroisomerization activity with minimum cracking activity and is capable of rearranging hydrocarbons at milder conditions than those employed with conventional noble metal containing catalysts. Processes have recently been proposed for the isomerization of pentane and/or hexane utilizing such noble metal catalysts. These processes are all carried out at relatively high temperature and are extremely temperature sensitive. In contrast, the processes for the isomerization of saturated hydrocarbons utilizing Friedel-Crafts metal halides promoted by hydrogen halides have been proposed for operation at relatively low temperature, as from about 50° to about 150° C. Decomposition reactions in such processes, as hereinabove set forth, are very pronounced and catalyst consumption and life are low. While the catalyst utilized in the process of the present invention requires temperatures intermediate between those for the several types of catalysts now known, the economic balance between additional heat requirement and catalyst life is very favorable for the process of the present invention.

The operating conditions to be employed will depend upon the particular compound being subjected to hydroisomerization and generally the temperatures will range from about 100° C. to about 300° C., although temperatures within the more limited range of from about 150° C. to about 275° C. are preferred. The pressure utilized will range from about 50 pounds per square inch to about 1500 pounds per square inch. As set forth hereinabove, the process of the present invention utilizing the above described catalyst is particularly adapted for a so-called fixed bed type process. In such a process, the compound or compounds to be hydroisomerized are passed in either an upward or downward flow over the catalyst along with hydrogen. The reaction products are then separated from the hydrogen, which may be recycled, and subjected to fractionation and separation of the desired reaction products. Recovered starting material is recycled so that the overall process conversion is high. In such processes the hourly liquid space velocity which is defined as the volume of reactants per unit time per volume of catalyst will be maintained within the general range of from about 0.25 to about 10 and preferably within the range of from about 0.5 to about 5.

Another means of effecting the hydroisomerization reaction of the process of the present invention is to employ a fluidized bed of catalyst wherein the reactant or reactants are passed upwardly through a bed of the catalytic material at a sufficient rate to maintain the individual particles of catalyst in a state of hindered settling. However, the rate of passage of reactant through the bed is not so great as to suspend the catalytic material in the stream of compound being subjected to hydroisomerization and carry the catalyst out of the reaction zone. As is readily apparent, smaller size particles than hereinabove described are more suitable for such a modified operation. If desired, the catalyst will be utilized in the form of so-called micro particles and the process may be effected in a two zone fluidized transfer process. In such a process when it is desired to regenerate the catalyst or to reactivate it by other means, the catalytic material may be suspended in a gas stream and conveyed to a second zone wherein it is contacted with reactivating material such as additional boron trifluoride, after which the reactivated catalyst is returned to the reaction zone wherein it is utilized to effect further conversion reactions. Another suitable two zone system may be the use of a moving bed wherein a desired bed of catalytic material slowly descends through the reaction zone, is discharged from the lower portion thereof into a reactivation zone, from which it is again transported to the top of the fixed bed in the reaction zone to descend again through the zone effecting further reactions in transit. Regardless of the particular operation employed, the products are fractionated or otherwise separated to recover the desired product and to separate unconverted material which may be recycled. Hydrogen in the effluent product is separated and preferably is recycled. Should catalyst activators such as hydrogen chloride be utilized they will also be separated and recycled in a like manner.

The following examples are introduced to illustrate further the novelty and utility of the present invention with no intention of unduly limiting the same.

EXAMPLE I

A platinum-alumina composite was prepared by the general method of dissolving aluminum pellets in hydrochloric acid to form a sol containing about 15% aluminum. Hydrofluoric acid was added to the sol so that the final composite contained 0.35% fluorine by weight based on the dry alumina. The resulting solution was mixed with hexamethylene tetramine in a continuous mixer and dropped into an oil bath at 90° C. to form spheres. The spheres were aged in oil, and then in an aqueous solution of ammonia (1–2 hours). The washed spheres were then transferred to a drier, dried at about 250° C., and calcined at about 600° C. These synthetically prepared alumina spheres were impregnated with an ammoniacal solution of chloroplatinic acid and the thus impregnated composite was then dried and recalcined. The amount of platinum in the impregnating solution was adjusted so that the final composite contained 0.375% platinum by weight based on the dry alumina. A sufficient quantity of this alumina was prepared so that it could be used in the preparation of various further composites.

A 50 cc. quantity of the above prepared composite was placed as a fixed bed in a reaction tube and tested for activity for the hydroisomerization of normal butane to isobutane. Conditions utilized included a pressure of 300 p.s.i.g., a hydrogen to hydrocarbon molar ratio of 0.5, and an hourly liquid space velocity of 1.0, and various temperatures. This composite is virtually inactive for the hydroisomerization of n-butane to isobutane during two hour test periods at temperatures of 100° C., 150° C., 200° C., 250° C., 300° C., and 350° C. At about 400° C., about 1.5% isobutane appears in the product. The temperature must be raised to about 470° C. before nearly equilibrium quantities of isobutane are observed in the product. At this temperature the product contains about 35% isobutane and about 65% normal butane. The reaction is exceedingly temperature sensitive with side reactions including cracking and disproportionation taking over rapidly within about a 10° C. temperature spread.

EXAMPLE II

Seventy grams of platinum-alumina composite prepared as described hereinabove are reduced in hydrogen for two hours at 600° C., and then are placed as a fixed bed in a stainless steel tube connected to a source of nitrogen and boron trifluoride. Nitrogen is passed through the tube and the temperature of the composite is raised to about 300° C. When this temperature has been reached, a stream of boron trifluoride is mixed into the incoming nitrogen stream and boron trifluoride addition is continued at this temperature until 27.5 grams of boron trifluoride have passed over the catalyst. The exit gases from the catalyst preparation zone are passed through a condenser in which a little more than 7 grams of water is collected. The reactions which are believed to take place can be illustrated by the following equations:

$$BF_3 + >Al-OH \rightarrow >Al-OBF_2 + HF$$

$$HF + >Al-OH \rightarrow >Al-F + H_2O$$

Weighing of the composite after removal from the catalyst preparation zone indicates that it has gained about 28% in weight which is in accordance with the above equations. Furthermore, the amount of water recovered indicates that one mol of hydrogen fluoride has been liberated by reaction of the boron trifluoride with the base for each mol of boron trifluoride reacted therewith.

A sample of this catalyst is utilized for the hydroisomerization of n-butane, n-pentane, and n-hexane. Fifty cc. of the catalyst is tested for the hydroisomerization of n-butane under the same conditions described hereinabove in Example I, that is, 300 p.s.i.g., 0.5 hydrogen to hydrocarbon molar ratio, 1.0 LHSV, and at various temperatures. Typical results are presented in the following table:

*Table I*

HYDROISOMERIZATION OF n-BUTANE IN THE PRESENCE OF 39% BORON TRIFLUORIDE REACTED WITH 0.375% PLATINUM ON ALUMINA

| Run No. | 1 | 2 | 3 | 4 | 5 | 6 |
|---|---|---|---|---|---|---|
| Temperature, °C | 125 | 150 | 175 | 200 | 225 | 250 |
| Product, Wt. Percent: | | | | | | |
| Isobutane | 1 | 3 | 12 | 25 | 53 | 44 |
| n-Butane | 99 | 97 | 88 | 75 | 44 | 46 |
| $C_1$-$C_3$ | 0 | 0 | 0 | 0 | 3 | 10 |

From these results it is obvious that the thus prepared catalyst is particularly effective for the hydroisomerization of n-butane to isobutane. Hydroisomerization is achieved in the absence of substantial amounts of cracking without the utilization of added hydrogen fluoride. Furthermore, this hydroisomerization is achieved at relatively low temperatures. At such low temperatures, equilibrium favors the formation of larger concentrations of isobutane than at higher temperatures. For example, at 225° C., the equilibrium quantities are 57% isobutane and 43% n-butane. These values are substantially achieved in Run 5 with a very small amount of concurrent cracking. In contrast to the data described in Example I, there is obtainable here over 15% more isobutane per pass merely by being able to operate at the lower temperature. This lower temperature also results in considerable heat savings in the commercial utilization of this hydroisomerization process.

EXAMPLE III

Another 50 cc. sample of the alumina-platinum-boron trifluoride composite containing >Al—O—BF$_2$ active centers, prepared as described in Example II, is utilized for the hydroisomerization of n-pentane to isopentane. This hydroisomerization of n-pentane is studied at 300 p.s.i.g., 1.0 LHSV, 1.3 hydrogen to hydrocarbon molar ratio, and at various temperatures. The results obtained are presented in the following table:

*Table II*

HYDROISOMERIZATION OF n-PENTANE IN THE PRESENCE OF 39% BORON TRIFLUORIDE REACTED WITH 0.375% PLATINUM ON ALUMINA

| Run No. | 7 | 8 | 9 | 10 | 11 | 12 |
|---|---|---|---|---|---|---|
| Temperature, °C | 125 | 150 | 175 | 200 | 225 | 250 |
| Product, Wt. Percent: | | | | | | |
| Isopentane | 19 | 37 | 65 | 59 | 50 | 35 |
| n-Pentane | 80 | 62 | 33 | 31 | 23 | 16 |
| $C_1$-$C_4$ | 1 | 1 | 2 | 10 | 27 | 49 |

From the above results it is readily apparent that this catalyst is effective for the hydroisomerization of n-pentane at relatively low temperatures. Hydrogen fluoride is not added in these experiments. Hydroisomerization of n-pentane takes place readily and equilibrium values are approached rapidly. Equilibrium is just about attained at 175° C. at which temperature cracking is very low. Higher temperatures result in an increase in cracking with a resultant loss of isopentane from the product.

EXAMPLE IV

This example illustrates the utilization of another catalyst for the hydroisomerization reaction, which catalyst is increased in weight by 16% after impregnation and reaction with boron trifluoride. This catalyst is prepared in substantially the same manner as described in Example II. Seventy grams of the base composite, prepared as described in Example I, are placed as a fixed bed in a stainless steel tube and nitrogen is passed thereover at 200° C. While the composite is maintained at 200° C., 13 grams of boron trifluoride are introduced into the nitrogen stream prior to contact thereof with the platinum-alumina composite. After the boron trifluoride addition is completed, the resultant composite is allowed to cool during which time the passage of nitrogen thereover is continued. Weighing of the composite after removal thereof from the reaction tube shows that it has gained about 16% in weight. Also, about 1.75 grams of water are collected in the condenser. This 1.75 grams of water indicates that just over 50% of the boron trifluoride has reacted with the hydroxyl groups on the surface of the alumina. Since none of the boron trifluoride is observed in the exit gases, about 0.5 mol of hydrogen fluoride must have been liberated per mol of boron trifluoride adsorbed thereon, and in accordance with the equations shown above.

Fifty cc. of the above described composite is utilized for the hydroisomerization of n-pentane at 300 p.s.i.g., 1.0 LHSV, 1.3 hydrogen to hydrocarbon molar ratio and at various temperatures, with a 24 hour line-out period at each temperature. Typical results which are obtained are presented in the following table:

*Table III*

HYDROISOMERIZATION OF n-PENTANE IN THE PRESENCE OF 16% BORON TRIFLUORIDE ADSORBED ON 0.375% PLATINUM ON ALUMINA

| Run No. | 13 | 14 | 15 |
|---|---|---|---|
| Temperature, °C | 200 | 250 | 300 |
| Product, Wt. Percent: | | | |
| Isopentane | 53 | 58 | 47 |
| n-Pentane | 46 | 41 | 32 |
| $C_1$-$C_4$ | 1 | 1 | 21 |

These results again illustrate an effective hydroisomerization process in the presence of the above catalyst. No added hydrogen fluoride is utilized in obtaining this hydroisomerization reaction. Equilibrium percentages of isopentane in the product are obtained at 250° C. with negligible side reactions.

EXAMPLE V

This example is introduced for comparative purposes utilizing a catalyst comprising boron trifluoride impregnated on and reacted with alumina. Thus, the results obtained from the processing described in this example can be compared with the prior examples. In this example, the support for the boron trifluoride is alumina spheres prepared substantially as described in Example I except that no chloroplatinic acid is composited therewith and thus the resultant catalyst is free from platinum.

Seventy grams of these platinum-free aluminum spheres are placed as a fixed bed in a stainless steel tube and nitrogen passage thereover is initiated. The composite is heated to a temperature of about 200° C. and 13.3 grams of boron trifluoride are added to the nitrogen stream and passed over the spheres. When all of the boron trifluoride is added, heating is stopped and the resultant composite is allowed to cool to room temperature. After removal from the stainless steel tube, the composite is found to have increased in weight by about 16%.

Fifty cc. of this composite is tested for the hydroisomerization of n-pentane. These tests are carried out at 300 p.s.i.g., 1.0 LHSV, 1.3 hydrogen to hydrocarbon molar ratio, and at various temperatures, with a 24 hour line-out period at each temperature. Typical results which are obtained are presented in the following table:

Table IV

HYDROISOMERIZATION OF n-PENTANE IN THE PRESENCE OF 16% BORON TRIFLUORIDE ON ALUMINA

| Run No | 16 | 17 | 18 | 19 |
|---|---|---|---|---|
| Temperature, °C | 150 | 200 | 250 | 300 |
| Product, Wt. Percent: | | | | |
| Isopentane | 0 | 5 | 15 | 18 |
| n-Pentane | 0 | 94 | 83 | 80 |
| $C_1$-$C_4$ | 0 | 1 | 2 | 2 |

These results should be compared with those presented in Example IV. Without the additional beneficial effect of the platinum component of the catalyst for use in the process of this invention, substantially less hydroisomerization is observed. While the composite of the present example may be active at higher temperatures and/or in the presence of added hydrogen fluoride, it is certainly not equivalent to a similar catalyst containing platinum as is illustrated in the results described in both Examples IV and V. In view of the results described herein, and in view of the results described in Example I wherein a platinum-alumina composite was tested, it is readily apparent that more than an additive effect is obtained by the utilization of a catalyst comprising platinum, alumina, and >Al—$OBF_2$ active centers in the herein described hydroisomerization process.

EXAMPLE VI

This example illustrates the utilization of a catalyst comprising boron trifluoride adsorbed on and reacted with alumina containing platinum for the hydroisomerization of normal hexane. In this example, the same sample of catalyst is utilized as that described in Example III for the hydroisomerization of n-pentane, and this sample is utilized after being utilized for said hydroisomerization of n-pentane. This study of the hydroisomerization of n-hexane is carried out at 300 p.s.i.g., 1.0 LHSV, 3.0 hydrogen to hydrocarbon molar ratio, and at varying temperatures. Typical results which are obtained are presented in the following table:

Table V

HYDROISOMERIZATION OF n-HEXANE IN THE PRESENCE OF 39% BORON TRIFLUORIDE REACTED WITH 0.375% PLATINUM ON ALUMINA

| Run No | 20 | 21 | 22 | 23 | 24 |
|---|---|---|---|---|---|
| Temperature, °C | 125 | 150 | 175 | 200 | 225 |
| Product, Wt. percent: | | | | | |
| Isohexanes | 22 | 30 | 55 | 63 | 67 |
| n-Hexane | 74 | 66 | 41 | 33 | 25 |
| $C_1$-$C_5$ | 4 | 4 | 4 | 4 | 8 |

Although the isomeric hexanes do not reach equilibrium within this temperature range and space velocity, this is due to the slower reactions involving the formation of 2,2- and 2,3-dimethylbutanes. The catalyst again demonstrates the utility of the present hydroisomerization process within the temperature ranges explored, even in the absence of added halogen containing promoter.

EXAMPLE VII

This example illustrates the utilization of the process of the present invention for the hydroisomerization of n-butane. The catalyst utilized in this example is prepared under conditions assuring the substantial absence of free boron trifluoride in the catalyst composition, and under conditions wherein two mols of hydrogen fluoride are formed per mol of boron trifluoride reacted with the platinum-alumina composite starting material. The catalyst utilized in this example is prepared in substantially the same manner as that described in Example II. Four hundred and seventy-one grams of platinum-alumina composite prepared as described in Example I are reduced in hydrogen for two hours at 600° C. and then are placed as a fixed bed in a stainless steel tube. Passage of nitrogen through the composite is begun and the temperature of the bed is raised to 400° C. After this temperature of 400° C. is attained, 46 grams of boron trifluoride are added to the nitrogen stream prior to contacting thereof with the platinum-alumina composite. After this amount of boron trifluoride has been added, the passage of nitrogen therethrough is continued until the composite is cooled to room temperature. After removal of the composite from the stainless steel tube, it is found to have gained in weight about 5%. Furthermore, over 23 grams of water are collected to the condenser. The reactions which are believed to have taken place can be represented by the following equations:

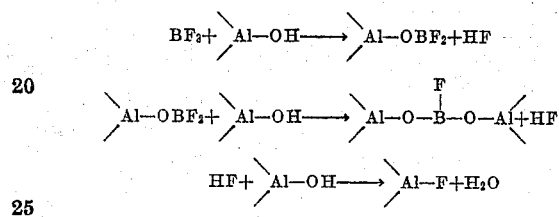

A sample of the above catalyst is utilized for the hydroisomerizaton of n-butane at 300 p.s.i.g., 0.5 hydrogen to hydrocarbon molar ratio, 1.0 LHSV, and at various temperatures. Typical results which are obtained are presented in the following table:

Table VI

HYDROISOMERIZATION OF n-BUTANE IN THE PRESENCE OF 9.8% BORON TRIFLUORIDE ON ALUMINA CONTAINING 0.375% PLATINUM

| Run No | 25 | 26 | 27 |
|---|---|---|---|
| Temperature, °C | 150 | 175 | 200 |
| Product, Wt. percent: | | | |
| Isobutane | 28 | 47 | 57 |
| n-Butane | 71 | 52 | 42 |
| $C_1$-$C_3$ | 1 | 1 | 1 |

It is readily apparent from the above data that the process of this invention is readily accomplished in the presence of the above disclosed catalyst, yielding nearly equilibrium conversion of n-butane to isobutane at 200° C., with only about 1% side reactions. This experiment is again carried out in the absence of added halogen promoter. This experiment again illustrates the beneficial effect which is obtained by utilization of the process of the present invention.

EXAMPLE VIII

This example illustrates the attempted utilization of the process of the present invention with a catalyst composition during the preparation of which more than 2.0 mols of hydrogen fluoride are formed per mol of boron trifluoride reacted therewith. The preparation of this catalyst is carried out in substantially the same manner as described in Example II.

Four hundred grams of platinum-alumina composite prepared as described in Example I are placed as a fixed bed in a stainless steel tube and the passage of nitrogen thereover is initiated. The composite is heated to a temperature of 500° C. and 35 grams of boron trifluoride are added to the nitrogen stream prior to passage thereof over the platinum-alumina composite. After addition of the boron trifluoride is completed, the composite is allowed to cool to room temperature. After removal from the stainless steel tube the composite is found to have increased in weight by only about 7 grams. Also, during the contacting of the boron trifluoride with the composite there is recovered about 18 grams of water and 10 grams of hydrogen fluoride, the latter being determined by titration of the recovered solution. These quantities correspond to the formation in the composite of 3 mols of hydrogen fluoride per mol of added boron trifluoride, only two-thirds of the formed hydrogen fluoride reacting further with free hydroxyl groups.

The resultant composite was tested for the hydroisomerization of n-butane at 300 p.s.i.g. 1.0 LHSV, 0.5 hydrogen to hydrocarbon ratio, and at various temperatures. This composite was found to be relatively inactive at temperatures up to about 400° C. at which temperature hydroisomerization begins to take place. However, at these high temperatures the reaction is exceedingly temperature sensitive with large amounts of cracking occurring concurrently.

We claim as our invention:

1. A process for the hydroisomerization of an isomerizable hydrocarbon which comprises contacting said isomerizable hydrocarbon and hyrogen at hydroisomerization conditions and a molar ratio of hydrogen to hydrocarbon of from about 0.25 to to about 10 with a catalyst prepared by reacting boron trifluoride with a refractory oxide containing chemically combined hydroxyl groups, which oxide has been composited previously with an inorganic hydrogenation component and calcined, said reaction being controlled to form at least 0.5 mol but not more than 2.0 mols of hydrogen fluoride per mol of boron trifluoride adsorbed on the catalyst.

2. A process for the hydroisomerization of a saturated hydrocarbon which comprises contacting said saturated hydrocarbon and hydrogen at hydroisomerization conditions and in a molar ratio of hydrogen to hydrocarbon of from about 0.25 to about 10 with a catalyst prepared by reacting boron trifluoride with a refractory oxide containing chemically combined hydroxyl groups, which oxide has been composited previously with an inorganic hydrogenation component and calcined, said reaction being controlled to form at least 0.5 mol but not more than 2.0 mols of hydrogen fluoride per mol of boron trifluoride adsorbed on the catalyst.

3. A process for the hydroisomerization of a less highly branched chain paraffin hydrocarbon to a more highly branched chain paraffin hydrocarbon which comprises contacting said less highly branched chain paraffin hydrocarbon and hydrogen at hydroisomerization conditions and in a molar ratio of hydrogen to hydrocarbon of from about 0.25 to about 10 with a catalyst prepared by reacting boron trifluoride with a refractory oxide containing chemically combined hydroxyl groups, which oxide has been composited previously with an inorganic hydrogenation component and calcined, said reaction being controlled to form at least 0.5 mol but not more than 2.0 mols of hydrogen fluoride per mol of boron trifluoride adsorbed on the catalyst.

4. A process of the hydroisomerization of a less highly branched chain paraffin hydrocarbon to a more highly branched chain paraffin hydrocarbon which comprises contacting said less highly branched chain paraffin hydrocarbon and hydrogen at hydroisomerization conditions and in a molar ratio of hydrogen to hydrocarbon of from about 0.25 to about 10 with a catalyst prepared by reacting boron trifluoride with a refractory oxide containing chemically combined hydroxyl groups, which oxide has been composited previously with a platinum group metal and calcined, said reaction being controlled to form at least 0.5 mol but not more than 2.0 mols of hydrogen fluoride per mol of boron trifluoride adsorbed on the catalyst.

5. A process for the hydroisomerization of a less highly branched chain paraffin hydrocarbon to a more highly branched chain paraffin hydrocarbon which comprises contacting said less highly branched chain paraffin hydrocarbon and hydrogen at hydroisomerization conditions and in a molar ratio of hydrogen to hydrocarbon of from about 0.25 to about 10 with a catalyst prepared by reacting boron trifluoride with a refractory metal oxide containing chemically combined hydroxyl groups, which oxide has been composited previously with a platinum group metal and calcined, said reaction being controlled to form at least 0.5 mol but not more than 2.0 mols of hydrogen fluoride per mol of boron trifluoride adsorbed on the catalyst.

6. A process for the hydroisomerization of a less highly branched chain paraffin hydrocarbon to a more highly branched chain paraffin hydrocarbon which comprises contacting said less highly branched chain paraffin hydrocarbon and hydrogen at hydroisomerization conditions and in a molar ratio of hydrogen to hydrocarbon of from about 0.25 to about 10 with a catalyst prepared by reacting boron trifluoride with a refractory oxide containing chemically combined hydroxyl groups, which oxide has been composited previously with platinum and calcined, said reaction being controlled to form at least 0.5 mol but not more than 2.0 mols of hydrogen fluoride per mol of boron trifluoride adsorbed on the catalyst.

7. A process for the hydroisomerization of a less highly branched chain paraffin hydrocarbon to a more highly branched chain paraffin hydrocarbon which comprises contacting said less highly branched chain paraffin hydrocarbon and hydrogen at hydroisomerization conditions and in a molar ratio of hydrogen to hydrocarbon of from about 0.25 to about 10 with a catalyst prepared by reacting boron trifluoride with a refractory metal oxide containing chemically combined hydroxyl groups, which oxide has been composited previously with platinum and calcined, said reaction being controlled to form at least 0.5 mol but not more than 2.0 mols of hydrogen fluoride per mol of boron trifluoride adsorbed on the catalyst.

8. A process for the hydroisomerization of a less highly branched chain paraffin hydrocarbon to a more highly branched chain paraffin hydrocarbon which comprises contacting said less highly branched chain paraffin hydrocarbon and hydrogen at hydroisomerization conditions and in a molar ratio of hydrogen to hydrocarbon of from about 0.25 to about 10 with a catalyst prepared by reacting boron trifluoride with alumina containing chemically combined hydroxyl groups, which alumina has been composited previously with platinum and calcined, said reaction being controlled to form at least 0.5 mol but not more than 2.0 mols of hydrogen fluoride per mol of boron trifluoride adsorbed on the catalyst.

9. A process for the hydroisomerization of a less highly branched chain paraffin hydrocarbon to a more highly branched chain paraffin hydrocarbon which comprises contacting said less highly branched chain paraffin hydrocarbon and hydrogen at hydroisomerization conditions and in a molar ratio of hydrogen to hydrocarbon of from about 0.25 to about 10 with a catalyst prepared by reacting boron trifluoride with gamma-alumina containing chemically combined hydroxyl groups, which gamma-alumina has been composited previously with platinum and calcined, said reaction being controlled to form at least 0.5 mol but not more than 2.0 mols of hydrogen fluoride per mol of boron trifluoride adsorbed on the catalyst.

10. A process for the hydroisomerization of n-butane which comprises contacting said n-butane and hydrogen at hydroisomerization conditions and in a molar ratio of hydrogen to hydrocarbon of from about 0.25 to about 10 with a catalyst prepared by reacting boron trifluoride with gamma-alumina containing chemically combined hydroxyl groups, which gamma-alumina has been composited previously with platinum and calcined, said reaction being controlled to form at least 0.5 mol but not more than 2.0 mols of hydrogen fluoride per mol of boron trifluoride adsorbed on the catalyst.

11. A process for the hydroisomerization of n-pentane which comprises contacting said n-pentane and hydrogen at hydroisomerization conditions and in a molar ratio of hydrogen to hydrocarbon of from about 0.25 to about 10 with a catalyst prepared by reacting boron trifluoride with gamma-alumina containing chemically combined hydroxyl groups, which gamma-alumina has been composited previously with platinum and calcined, said reaction being controlled to form at least 0.5 mol but not more than 2.0 mols of hydrogen fluoride per mol of boron trifluoride adsorbed on the catalyst.

12. A process for the hydroisomerization of n-hexane which comprises contacting said n-hexane and hydrogen at hydroisomerization conditions and in a molar ratio of hydrogen to hydrocarbon of from about 0.25 to about 10 with a catalyst prepared by reacting boron trifluoride with gamma-alumina containing chemically combined hydroxyl groups, which gamma-alumina has been composited previously with platinum and calcined, said reaction being controlled to form at least 0.5 mol but not more than 2.0 mols of hydrogen fluoride per mol of boron trifluoride adsorbed on the catalyst.

13. A process for the hydroisomerization of 2-methylpentane which comprises contacting said 2-methylpentane and hydrogen at hydroisomerization conditions and in a molar ratio of hydrogen to hydrocarbon of from about 0.25 to about 10 with a catalyst prepared by reacting boron trifluoride with gamma-alumina containing chemically combined hydroxyl groups, which gamma-alumina has been composited previously with platinum and calcined, said reaction being controlled to form at least 0.5 mol but not more than 2.0 mols of hydrogen fluoride per mol of boron trifluoride adsorbed on the catalyst.

14. A process for the hydroisomerization of 3-methylpentane which comprises contacting said 3-methylpentane and hydrogen at hydroisomerization conditions and in a molar ratio of hydrogen to hydrocarbon of from about 0.25 to about 10 with a catalyst prepared by reacting boron trifluoride with gamma-alumina containing chemically combined hydroxyl groups, which gamma-alumina has been composited previously with platinum and calcined, said reaction being controlled to form at least 0.5 mol but not more than 2.0 mols of hydrogen fluoride per mol of boron trifluoride adsorbed on the catalyst.

References Cited in the file of this patent
UNITED STATES PATENTS

| | | |
|---|---|---|
| 2,351,577 | Thomas | June 13, 1944 |
| 2,748,090 | Watkins | May 29, 1956 |